Patented Mar. 5, 1929.

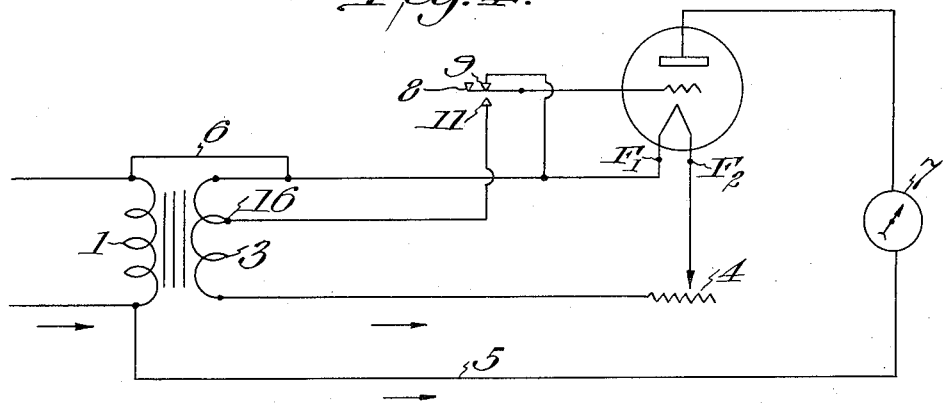
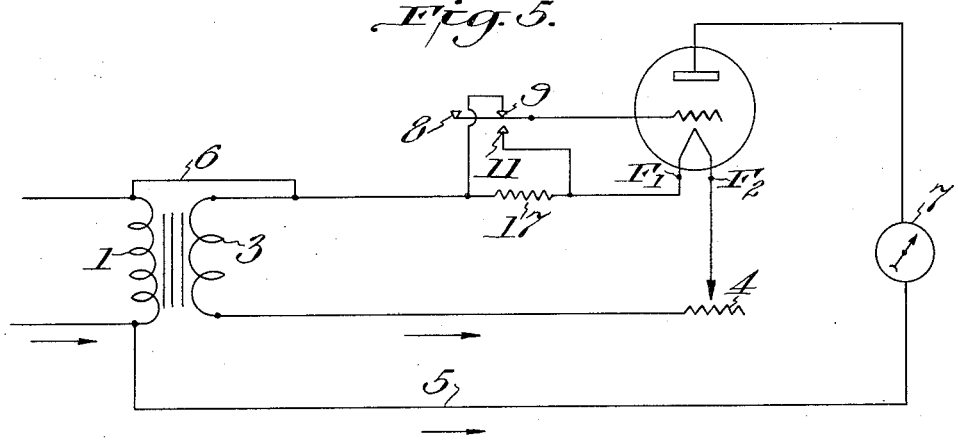
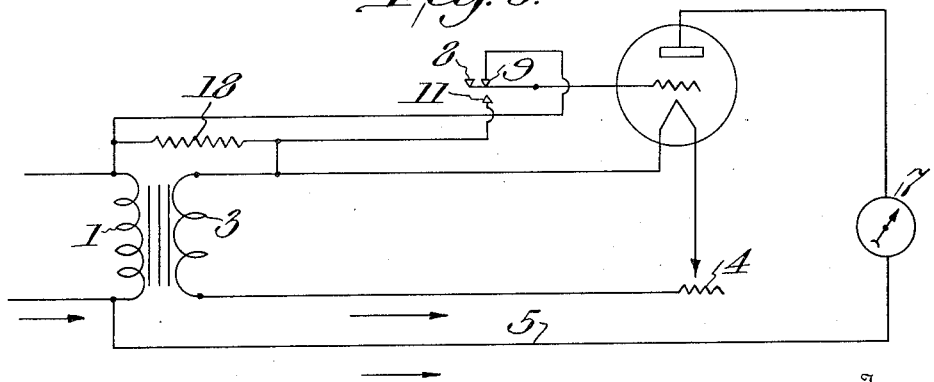

1,704,566

UNITED STATES PATENT OFFICE.

WILLIAM NELSON GOODWIN, JR., OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

TESTING VACUUM TUBES. REISSUED

Application filed August 17, 1927. Serial No. 213,643.

This invention relates to a method of and apparatus for testing vacuum tubes and particularly to operations and apparatus in which an alternating current source may be employed to energize all of the circuits.

A well known method for making a simple test on a tube is to energize the plate and filament circuits in the usual manner by means of batteries, and then measure the plate current for two values of grid biasing potential, obtained either by grid batteries, or by taking advantage of the drop in potential across the filament produced by the heating current.
In the former case, the plate current is measured with and without the grid battery and in the latter case, the plate current is measured first with the grid connected to one side of the filament and then with it connected to the other side.

Testing devices using alternating current for plate and filament circuits have been used, but only for testing the total emission of the tube; that is, the measurement of the plate current when plate and grid are connected together. This method, however, is in general, harmful to the tube. It is very desirable, therefore, to bias the grid by a voltage which will reduce the plate current to approximately operating condition. This, of course, can be accomplished by the use of a grid battery, but such a method destroys the simplicity of pure alternating current operation.
Objects of the present invention are to provide a method of and apparatus for testing audion tubes which avoid these disadvantages which have been encountered under the former practice. Further objects are to provide a testing system in which a variable grid bias may be applied from the alternating current source which energizes the plate and filament circuits. More specifically, an object is to provide tube testing apparatus adapted to be operated from an alternating current source for energizing the plate and filament circuits of a tube, and for applying biasing voltages upon the grid of the tube.
These and other objects of the invention will be apparent from the following specification when taken with the accompanying drawings, in which, Fig. 1 is a circuit diagram of an alternating current tube tester embodying the invention.

Figs. 4, 5 and 6 are circuit diagrams of other embodiments of the invention.

Figure 1:
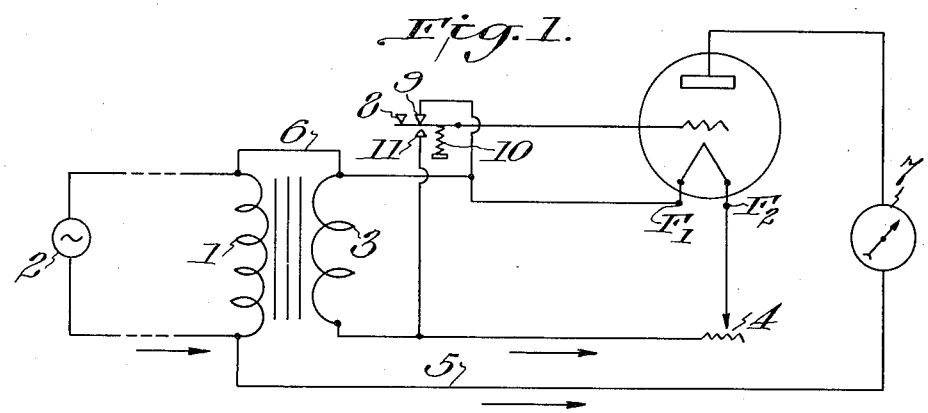

In the drawings, the numeral 1 indicates the primary of a transformer which is adapted to be connected across a source 2 of alternating current, which source may, for convenience, be an ordinary lighting circuit.
The secondary winding 3 of the transformer is designed to deliver a voltage suitable for the energization of the filament circuit. A regulating rheostat 4 is preferably included in the filament lighting circuit, and for the testing of the commercial types of audions, the rheostat is so chosen that the normal operating voltage may be impressed across the filament when the potential across the secondary 3 is 6 volts.

When operating from the usual lighting circuit which delivers 60 cycle current at 110 volts, the plate circuit may be energized directly from the source 2 by a connection 5 from one terminal of the primary 1 to the plate terminal of the audion, and a connection 6 from the other terminal of the primary to a terminal of the secondary 3. The connection 5 includes a milliammeter 7 for indicating the flow of current in the plate circuit.

The grid of the audion tube is not connected permanently to a fixed point in the electrical network, but to the heel of a contact key 8, which key is normally held in engagement with a contact 9 by a spring 10, or by its own flexure. Contact 9 is connected to the filament terminal $F^1$ which is directly connected to one terminal of the secondary 3, and a second contact 11 is connected to the opposite side of the filament supply circuit.
As shown in the drawing, the connection to contact 11 is made between the secondary and the rheostat 4, thus permitting a grid voltage variation equal to the entire secondary voltage, but the connection may extend to the other terminal $F^2$ of the filament, in which case the grid voltage may be changed by the value of the voltage drop across the filament.

The electrical network is preferably so arranged that the transformer polarities during the effective half-cycle are as indicated by the arrows in Fig. 1. With the contact key in its normal position of engagement with contact 9, the grid has a negative bias during the half-cycle when plate current is flowing and so reduces the plate current to its minimum value. When the key is depressed into engagement with contact 11, a positive bias is impressed upon the grid during the effective half-cycle and increases the plate current to its maximum value.

The magnitude of the plate current and the difference between the currents with the key up or down are a test of the quality of the audion.

The connections as illustrated in Fig. 1 are preferred for the reason that the plate current is a minimum for the normal position of the key and is thus less harmful for the tube. This condition can, however, be reversed by interchanging the connections to the key contacts 9, 11, or by reversing the polarity of the transformer.

Figure 2:
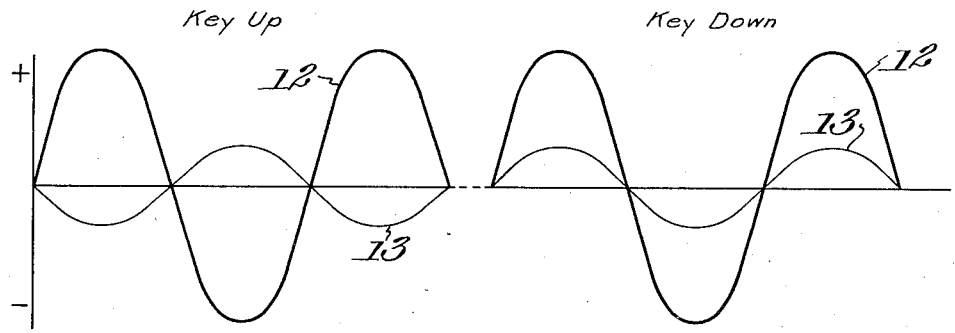
Figs. 2 and 3 are diagrams illustrating the operation of the audion tester.
Figure 3:
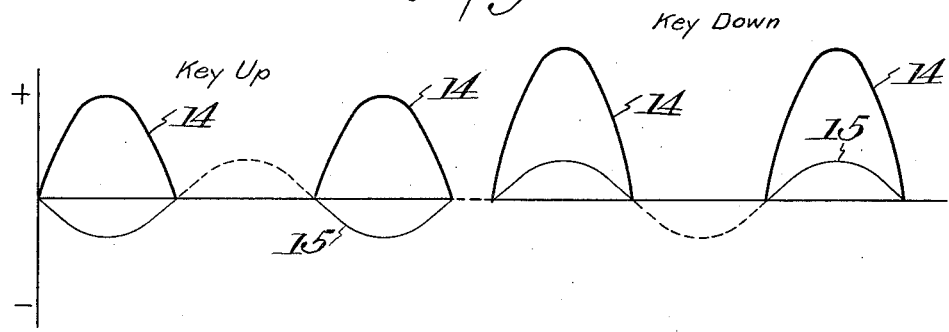

The theory of operation as above described will be apparent from Figs. 2 and 3. The curves of Fig. 2 represent potentials applied, the heavy line 12 indicating the potential of the plate relative to the filament and the lighter line 13 representing the potential of the grid with reference to the filament. As indicated by the legends the curves at the left side of the figure indicate the grid and plate potentials when the key 8 is in engagement with contact 9 and the curves at the right of the figure indicate the potentials when the key is depressed into engagement with contact 11. The heavy line curves 14 of Fig. 3 indicate the magnitude of the plate current and the lighter curve 15 indicates the grid potential. The curve 15 is of course a duplicate of curve 13 of Fig. 2 but is redrawn on Fig. 3 for the sake of clearness. The full line portion of curve 15 indicates the grid potential relative to the filament during the half cycle in which plate current flows, and represents the only pediods during which the grid is effective to control the plate current. The dotted line portions of curve 15 indicate the grid potential during the half cycles when the plate potential is negative and represent the periods during which the grid potential has no effect upon plate current. As shown in Fig. 2, the grid potential is negative when the key is up and tends to decrease the plate current, and the grid potential is positive and tends to increase the plate current when the key is down. The effect upon current flow of the different grid potentials is indicated graphically in Fig. 3.

The provision of grid potentials of different values and/or of different sign may be effected by alternative connections to any two spaced points in the network which forms the filament and plate circuits. The term "spaced points" is employed in the specification and claims to identify two points between which a difference in potential exists at any instant.

Figs. 4, 5 and 6 illustrate other circuits which embody the invention, and in these views the circuit elements which are identical with corresponding elements of Fig. 1 are identified by the same reference numerals. In each of these views the arrows indicate the polarity of the potentials during the half cycle when the plate potential is positive. In each of these modified circuits the construction is such that a negative bias is placed on the grid when the key 8 is in engagement with the upper contact 9.

As shown in Fig. 4 the contact 9 is connected to the lead between one terminal of the filament and the transformer secondary 3. The more positive potential for biasing the grid may be obtained by a tap on one of the transformer windings, and as shown in Fig. 4, the contact 11 is connected to an intermediate point 16 of the secondary winding 3.

As shown in Fig. 5 the two alternative potentials for biasing the grid are obtained by the voltage drop across a resistor in the primary or secondary circuits. In the particular embodiment illustrated the key contact 9 is connected to that terminal of the secondary which is at a negative potential when the plate potential is positive, and a resistor 17 is provided between that terminal and the filament. The contact 11 is connected between the resistor 17 and the filament and is therefore at a more positive potential than the contact 9 during the effective half cycles when the plate is positive.

As shown in Fig. 6 the bias voltages are obtained by the drop across a resistor in the plate circuit which resistor 18 forms a connection between the two transformer windings. In this form the key contact 9 is connected to the primary winding side of the resistor 18 and the positive contact 11 is connected to the opposite end of the resistor.

It will be apparent that the grid bias may be obtained from any alternating current source which is in synchronism with the plate potential. So far as I am aware it is broadly new to test vacuum tubes by measuring the variation in plate current produced by the change in grid bias voltage derived from the half cycle of an alternating current voltage. The invention is not limited to the particular methods and apparatus which are herein described as various changes may be made within the scope of my invention as set forth in the following claims.

What is claimed is:

1. The method of testing an audion tube which comprises energizing the filament, plate and grid circuits from a source of alternating current, indicating the plate current established by the applied alternating current grid bias, changing the phase relationship of the applied plate and grid voltages, and indicating the plate current established by such change of the energizing voltages.

2. The method of testing an audion tube which comprises energizing the plate and filament circuits from an alternating current source, serially impressing upon the grid different alternating voltages, and indicating the magnitude of plate current established by each of the applied grid voltages.

3. The method of testing an audion tube which comprises energizing the plate and filament circuits from a source of alternating current, and alternatively connecting the grid to two spaced points in one of said energizing circuits, whereby different biasing voltages are applied to the grid.

4. In an audion tube tester, an electrical network for connection between a source of alternating current and an audion, said network comprising elements for establishing circuits to energize the audion filament and plate circuits from said source, and circuit elements including a switch for alternatively impressing upon the grid the alternating voltages established at two spaced points in said network by said source.

5. An audion tube tester comprising a source of alternating current, circuit elements extending from opposite terminals of said source to the plate and filament of a tube to form a plate energizing circuit, a filament circuit including means energized by said source for impressing an appropriate voltage across the tube filament terminals, and means for alternatively connecting the grid to two spaced points in one of said circuits, whereby different bias voltages may be impressed upon said audion.

6. In an audion tube tester, a transformer having a primary winding adapted to be connected across a source of alternating current and a secondary winding adapted to energize the audion filament circuit, connections from opposite terminals of said primary winding to a filament and the plate terminal respectively, and means for alternatively connecting said grid to two points in the electrical network which are at different alternating potentials.

7. In an audion tube tester, a step-down transformer having a primary adapted to be connected across an alternating current source and a secondary adapted to energize an audion filament, a plate circuit in parallel with said transformer primary, a filament circuit connected across said secondary, and means for alternatively connecting the audion grid to two spaced points in one of said circuits.

8. The invention as set forth in claim 4 in combination with means for normally holding said switch in one of its alternative positions, the circuit elements being so arranged that said normal position of the switch establishes a negative bias during the half-cycle when the plate potential is positive.

In testimony whereof, I affix my signature.

WILLIAM NELSON GOODWIN, Jr.